(12) United States Patent
Huang (10) Patent No.: US 9,220,366 B2
(45) Date of Patent: Dec. 29, 2015

(54) COOKING DEVICE

(71) Applicant: Shan-Shao Huang, Changhua (TW)

(72) Inventor: Shan-Shao Huang, Changhua (TW)

(73) Assignee: Ting Shan Enterprise CO., Ltd., Taichung (TW)

( * ) Notice: Subject to any disclaimer, the term of this patent is extended or adjusted under 35 U.S.C. 154(b) by 413 days.

(21) Appl. No.: 13/621,269

(22) Filed: Sep. 16, 2012

(65) Prior Publication Data

US 2013/0074704 A1   Mar. 28, 2013

(30) Foreign Application Priority Data

Sep. 26, 2011   (TW) .............................. 100217964 U (51) Int. Cl.
| | |
|---|---|
| *A47J 37/04* | (2006.01) |
| *A47J 37/06* | (2006.01) |
| *A47J 37/07* | (2006.01) |
| *A47J 43/18* | (2006.01) |

(52) U.S. Cl.
CPC .............. *A47J 37/041* (2013.01); *A47J 37/043* (2013.01); *A47J 37/0694* (2013.01)

(58) Field of Classification Search
CPC . A47J 37/0704; A47J 37/0694; A47J 37/045; A47J 37/041; A47J 37/043; A47J 37/049; A47J 39/00; A21B 3/155
USPC ............ 99/339, 419, 420, 421 H, 421 V, 427, 99/448, 450, 421 P
See application file for complete search history.

(56) References Cited

U.S. PATENT DOCUMENTS

| | | | | |
|---|---|---|---|---|
| 1,782,639 | A * | 11/1930 | Van Allen | 99/421 R |
| 1,838,545 | A * | 12/1931 | Guffey | 99/421 P |
| 2,040,016 | A * | 5/1936 | Sanders | 475/11 |
| 2,819,667 | A * | 1/1958 | Victor | 99/339 |
| 3,168,862 | A * | 2/1965 | Clouser, Jr. | 99/421 HH |
| 3,211,081 | A * | 10/1965 | Miceli | 99/421 V |
| 3,309,982 | A * | 3/1967 | Surks | 99/420 |
| 4,286,133 | A * | 8/1981 | Einset et al. | 219/753 |
| 4,982,657 | A | 1/1991 | Ghenic | |
| 5,146,842 | A * | 9/1992 | Romano | 99/421 V |
| 5,964,212 | A * | 10/1999 | Thompson | 126/25 R |
| 6,279,465 | B1 * | 8/2001 | English | 99/339 |
| 7,823,577 | B1 * | 11/2010 | Babjak | 126/25 AA |

FOREIGN PATENT DOCUMENTS

| | | |
|---|---|---|
| JP | 561164623 | 10/1986 |
| JP | 3001425 U | 8/1994 |
| JP | 3148377 U | 2/2009 |

* cited by examiner

*Primary Examiner* — Dana Ross
*Assistant Examiner* — Hemant Mathew
(74) *Attorney, Agent, or Firm* — Holland & Hart LLP (57) ABSTRACT

A cooking device includes: a base; a rotation transmission member mounted rotatably on the base and having a cylindrical surrounding wall that defines an annular top transmission face; a plurality of holding shafts supported rotatably on the base; a plurality of driven wheels secured to and extending radially from the holding shafts, respectively, each of the driven wheels having an outer end face engaging the top transmission face in such a manner to drive rotation of each of the holding shafts upon rotation of the rotation transmission member; and a driving member for driving rotation of the rotation transmission member.

14 Claims, 9 Drawing Sheets

COOKING DEVICE

CROSS-REFERENCE TO RELATED APPLICATION

This application claims priority of Taiwanese Application No. 100217964, filed on Sep. 26, 2011.

BACKGROUND OF THE INVENTION

1. Field of the Invention

This invention relates to a cooking device, more particularly to a cooking device including a plurality of rotatable holding shafts for holding food thereon.

2. Description of the Related Art

U.S. Pat. No. 4,982,657 discloses a conventional hot dog roaster that includes a housing, a handle mounted rotatably on the housing, a central gear attached directly to the handle, two side gears meshing with the central gear and aligned with the central gear in a direction perpendicular to a rotation axis of the central gear, three disks connected respectively to the central gear and the side gears, and three hot dog-holding members (each including a plurality of wire elements) extending axially and respectively from the disks for holding hot dogs above a grill. As such, rotation of the handle can result in co-rotation of the hot dog-holding members through engagement among the central gear and the side gears.

The conventional hot dog roaster is disadvantageous in that when the number of the gears is much greater than three, the length of the hot dog roaster will be too long for a small space and that since the hot dog roaster cannot be rotated relative to the grill, uneven cooking of the hot dogs may occur due to hot spots of the heating action of charcoal in the grill.

SUMMARY OF THE INVENTION

Therefore, an object of the present invention is to provide a cooking device that can overcome at least one of the aforesaid drawbacks associated with the prior art.

According to this invention, there is provided a cooking device that comprises: a base; a rotation transmission member disposed above and mounted rotatably on the base and having a cylindrical surrounding wall that defines an annular top transmission face, the rotation transmission member being rotatable relative to the base about a first axis of the cylindrical surrounding wall; a plurality of angularly-displaced holding shafts supported rotatably on the base, each of the holding shafts defining a second axis, being rotatable relative to the base about the second axis, and being provided with a holding means that is adapted to hold a food-holding element; a plurality of driven wheels secured to and extending radially from the holding shafts, respectively, each of the driven wheels having an outer end face engaging the top transmission face in such a manner to drive rotation of each of the holding shafts about the second axis upon rotation of the rotation transmission member about the first axis; and a driving member for driving rotation of the rotation transmission member about the first axis.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

FIGS. 1 to 4 illustrate the first preferred embodiment of a cooking device according to the present invention. The cooking device includes a base 1, a rotation transmission member 2, a heat supplying unit 3, a food-holding unit, and a driving member 5.

The base 1 is in the form of a circular plate, and has a top surface 11. An annular central bearing sleeve 121 extends upright from the top surface 11 of the base 1. A plurality of roller bearings 122 are provided on the top surface 11 of the base 1, and are angularly displaced from each other.

The rotation transmission member 2 is disposed above and is mounted rotatably on the base 1, and has a central shaft 20, a bottom wall 21 and a cylindrical surrounding wall 22 that defines an annular top transmission face 221 and that extends upright from a periphery of the bottom wall 21. The central shaft 20 extends downwardly from the bottom wall 21 into the central bearing sleeve 121, and is in rotational contact with the central bearing sleeve 121. The bottom wall 21 is in rotational contact with the roller bearings 122. The rotation transmission member 2 is rotatable relative to the base 1 about a first axis (X) of the cylindrical surrounding wall 22. The surrounding wall 22 is formed with a plurality of air through-holes 222.

In this embodiment, the heat supplying unit 3 is in the form of a cylindrical container, is adapted to receive a solid fuel (not shown), such as charcoal therein, and is formed with a plurality of air holes 31. The heat supplying unit 3 is mounted on the bottom wall 21, and is surrounded by the surrounding wall 22. The heat supplying unit 3 is spaced apart from the surrounding wall 22 by an annular gap 200. The air through-holes 222 in the surrounding wall 22 are in fluid communication with the air holes 31 in the heat supplying unit 3 through the annular gap 200.

The food-holding unit includes: a plurality of upright supporting plates 42 extending upright from the base 1 and disposed angularly around and spaced apart from the surrounding wall 22; a plurality of hinge plates 41 pivoted to the upright supporting plates 42, respectively; a plurality of shaft bearing sleeves 43 mounted on the hinge plates 41, respectively; and a plurality of holding shafts 44 disposed above the top transmission face 221 and extending into and being in rotational contact with the shaft bearing sleeves 43, respectively, so as to be supported rotatably on the base 1. Each of the holding shafts 44 defines a second axis (Y), is rotatable relative to the base 1 about the second axis (Y), and is provided with a holding means 47 adapted to hold a food-holding element 6, such as a stick or a tine. A plurality of driven wheels 45 are secured to and extend radially from the holding shafts 44, respectively. Each of the holding shafts 44 is formed with an axial insert channel 442 that defines the holding means 47. As such, the food-holding element 6 can have one end inserted into the axial insert channel 442 and the other end holding food, such as a hot dog 7, above a heating space 300 defined by the heat supplying unit 3.

Each of the driven wheels 45 has an outer end face 451 disposed above and engaging the top transmission face 221 in such a manner to drive rotation of each of the holding shafts 44 about the second axis (Y) upon rotation of the rotation transmission member 2 about the first axis (X). The second axis (Y) is perpendicular to the first axis (X). In this embodiment, the top transmission face 221 is toothed and has saw-like teeth, and the outer end face 451 of each of the driving wheels 45 is toothed, has saw-like teeth and meshes with the top transmission face 221.

Each of the hinge plates 41 is rotatable relative to the respective one of the upright supporting plates 42 between a horizontal position (see FIGS. 1 and 3), where the corresponding one of the holding shafts 44 extends in a radial direction relative to the first axis (X), and an upright position (see FIGS. 1 and 3), where the corresponding one of the holding shafts 44 extends in a vertical direction substantially parallel to the first axis (X).

The driving member 5 is disposed between two adjacent ones of the upright supporting plates 42 for driving rotation of the rotation transmission member 2 about the first axis (X). The driving member 5 includes a handle 51, a crankshaft 52 supported rotatably on the base 1 through a crank-supporting plate 54, and a driving wheel 53 extending radially from the crankshaft 52 and having an outer end face 531 disposed above and engaging the top transmission face 221 in such a manner to drive rotation of the rotation transmission member 2 about the first axis (X). In this embodiment, the outer end face 531 of the driving wheel 53 is toothed, has saw-like teeth and meshes with the top transmission face 221.

Figure 1:
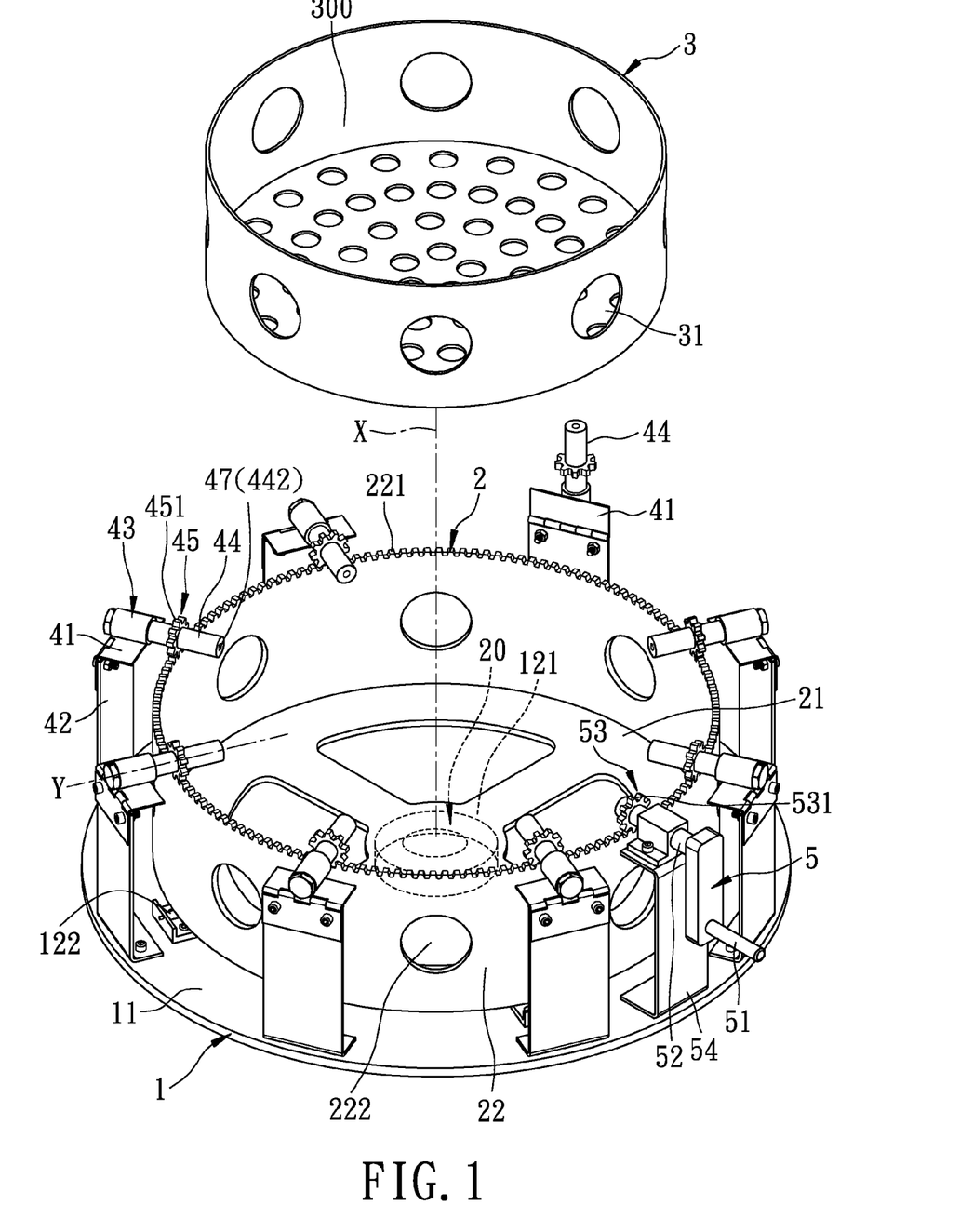
FIG. 1 is an exploded perspective view of the first preferred embodiment of a cooking device according to the present invention.
Figure 2:
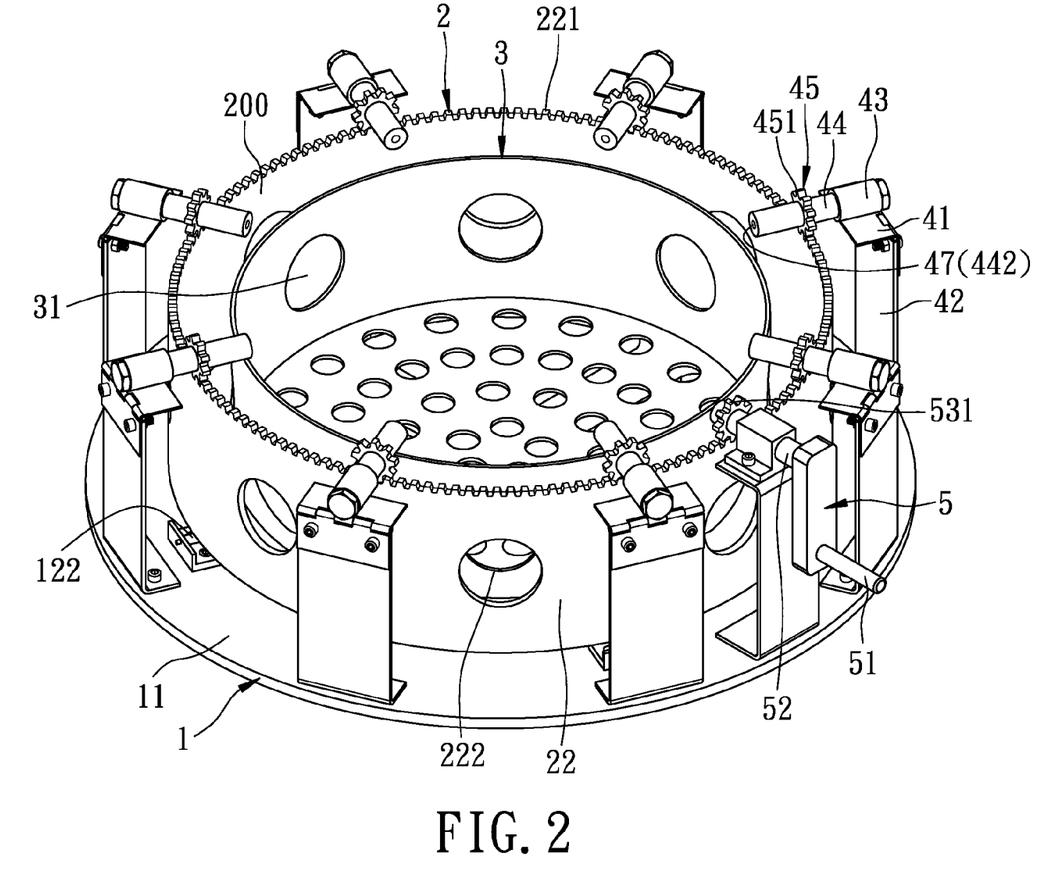
FIG. 2 is an assembled perspective view of the first preferred embodiment.
Figure 3:
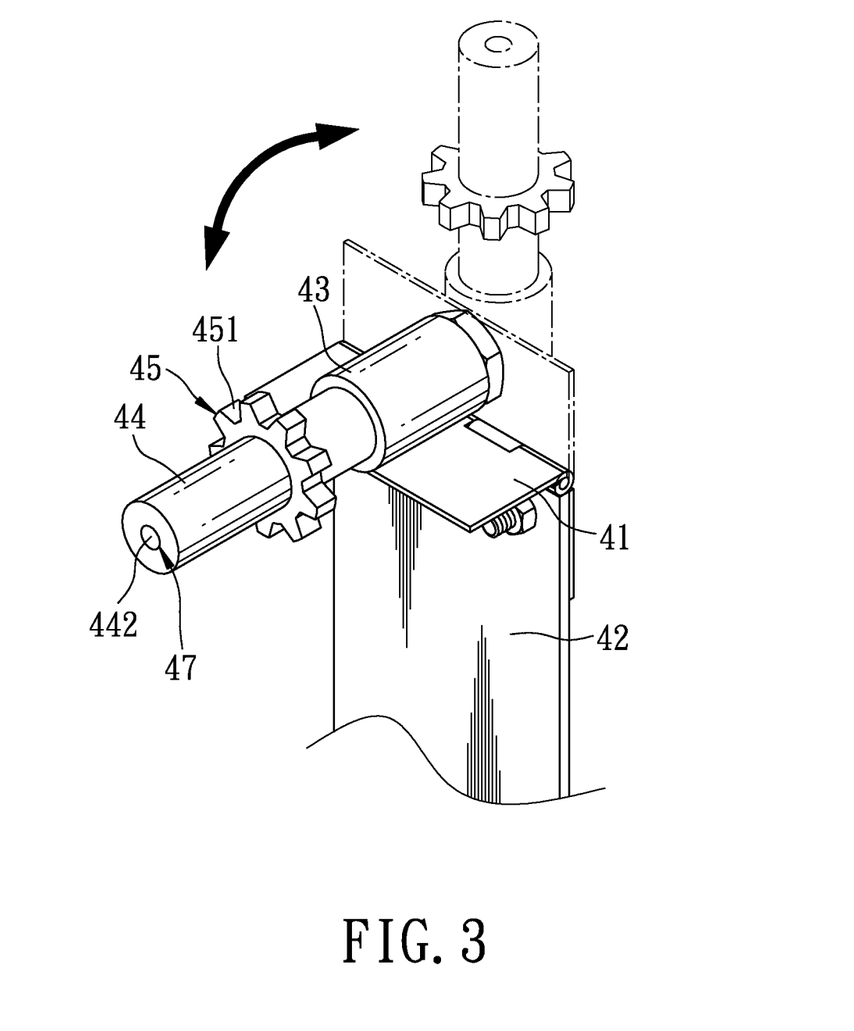
FIG. 3 is a fragmentary perspective view illustrating how a holding shaft can be rotated from a horizontal position to an upright position through a hinge plate of the first preferred embodiment.
Figure 4:
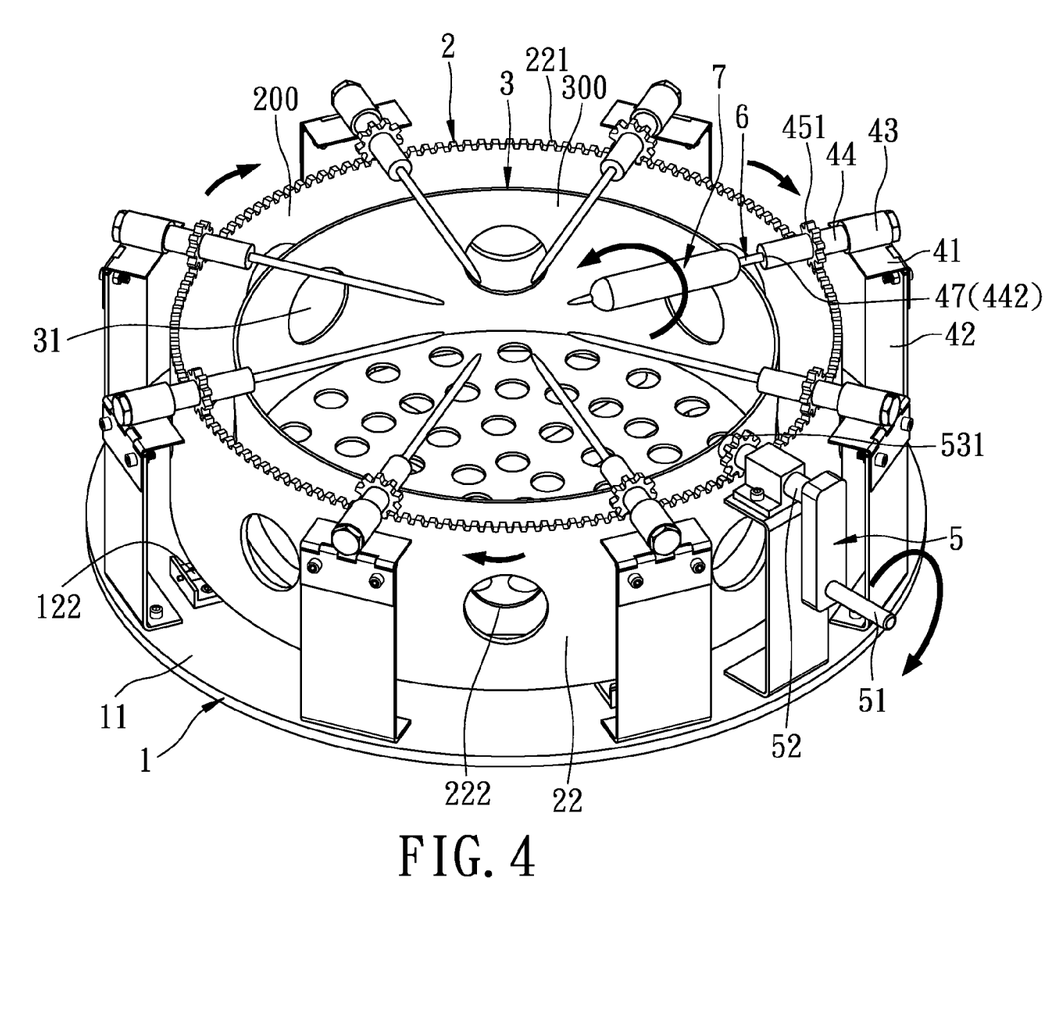
FIG. 4 is an assembled perspective view illustrating how a hot dog is held on the holding shaft of the first preferred embodiment through a stick.

In operation, as illustrated in FIG. 4, when the handle 51 is manually operated, the surrounding wall 22 together with the heat supplying unit 3 is rotated about the first axis (X), which, in turn, drives rotation of the holding shafts 44 about the second axes (Y) simultaneously.

Figure 5:
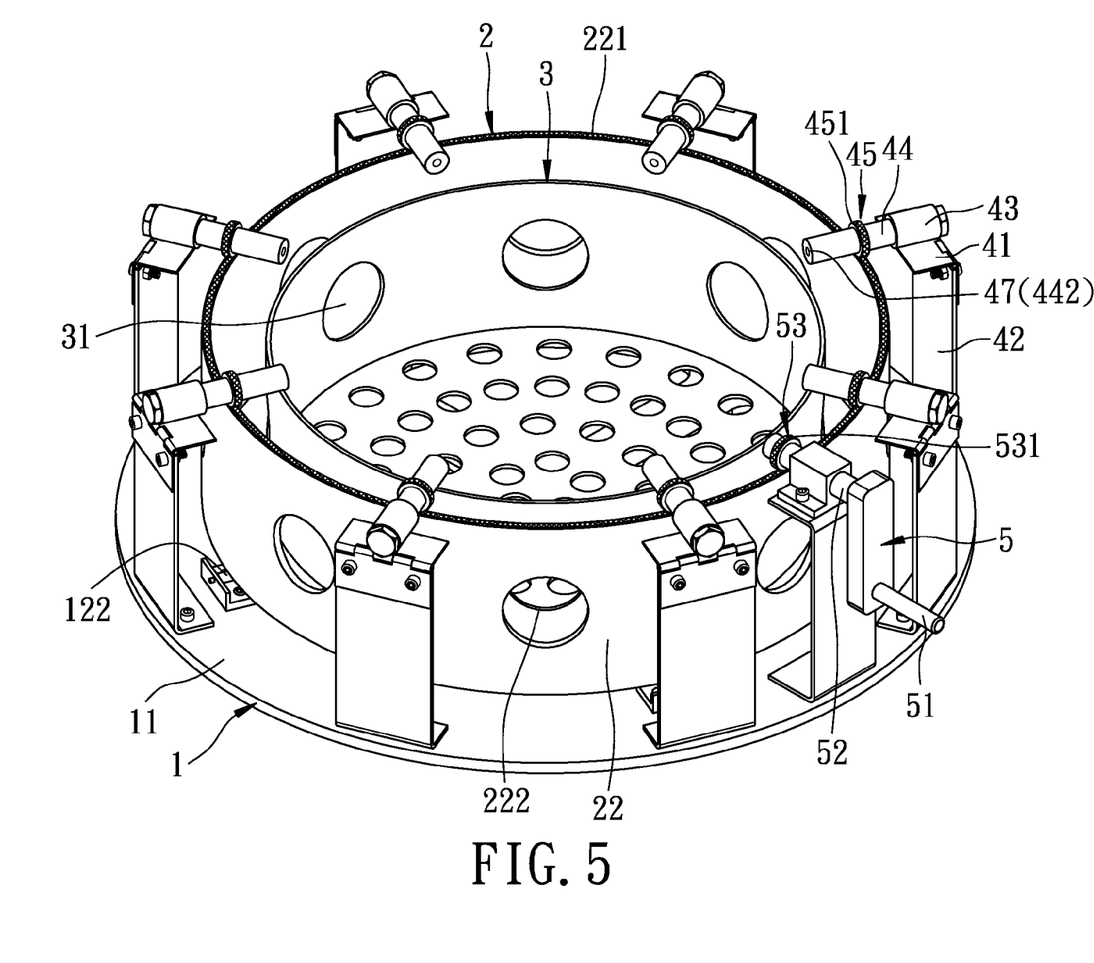
FIG. 5 is an assembled perspective view of the second preferred embodiment of a cooking device according to the present invention.

FIG. 5 illustrates the second preferred embodiment of the cooking device according to the present invention. The second preferred embodiment differs from the previous embodiment in that, in this embodiment, the top transmission face 221 of the surrounding wall 22, the outer end face 451 of each of the driven wheels 45, and the outer end face 521 of the driving wheel 52 are roughened and have a coarse structure similar to that of a rasp. As such, by utilizing frictional contact between the top transmission face 221 of the surrounding wall 22 and the outer end face 451 of each of the driven wheels 45 and between the top transmission face 221 of the surrounding wall 22 and the outer end face 521 of the driving wheel 52, simultaneous rotation of the surrounding wall 22 about the first axis (X) and the holding shafts 44 about the second axes (Y) can be achieved.

Figure 6:
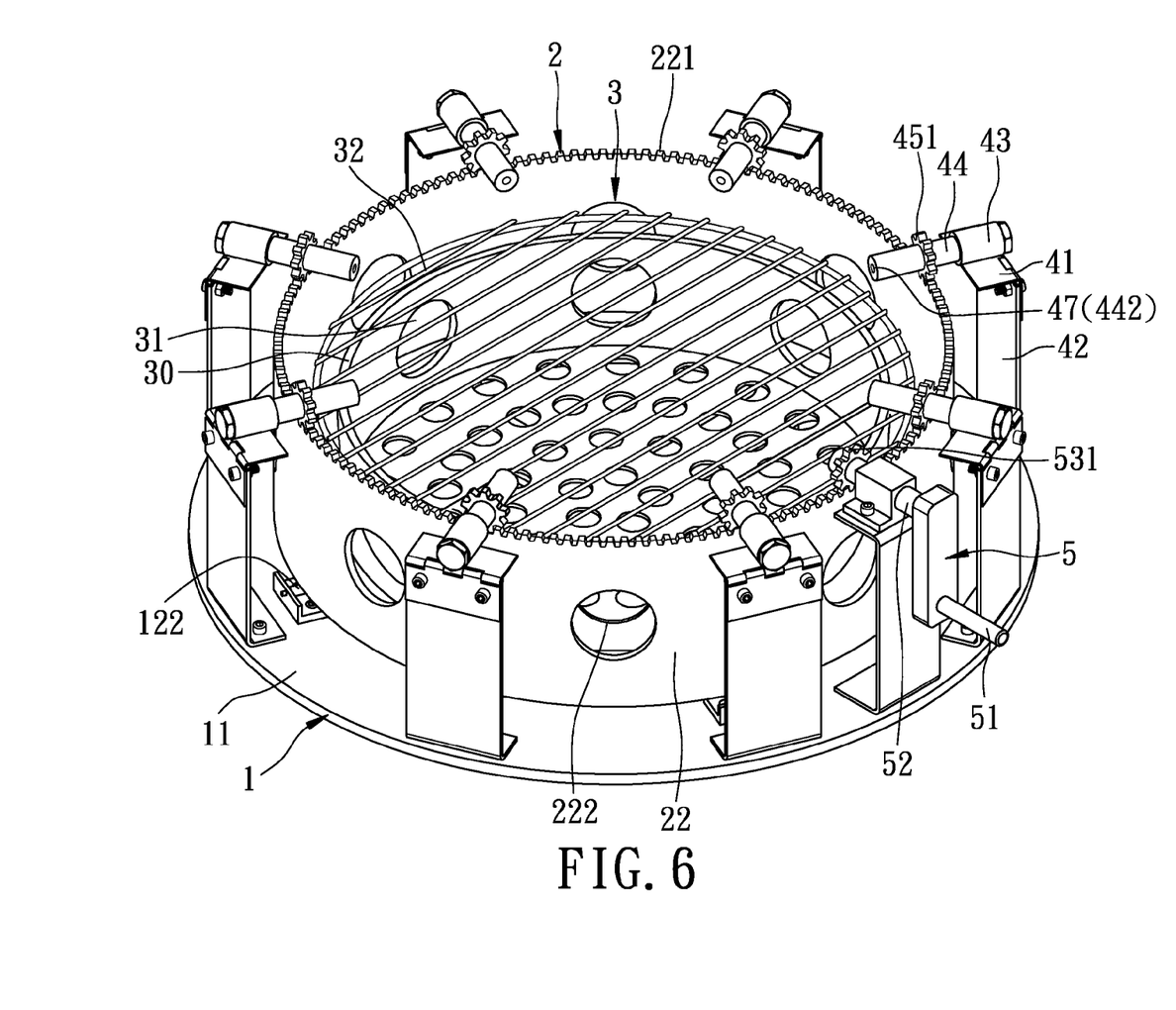
FIG. 6 is an assembled perspective view of the third preferred embodiment of a cooking device according to the present invention.

FIG. 6 illustrates the third preferred embodiment of the cooking device according to the present invention. The third preferred embodiment differs from the first embodiment in that this embodiment further includes a grill screen 32 disposed on a top end 30 of the heat supplying unit 3.

Figure 7:
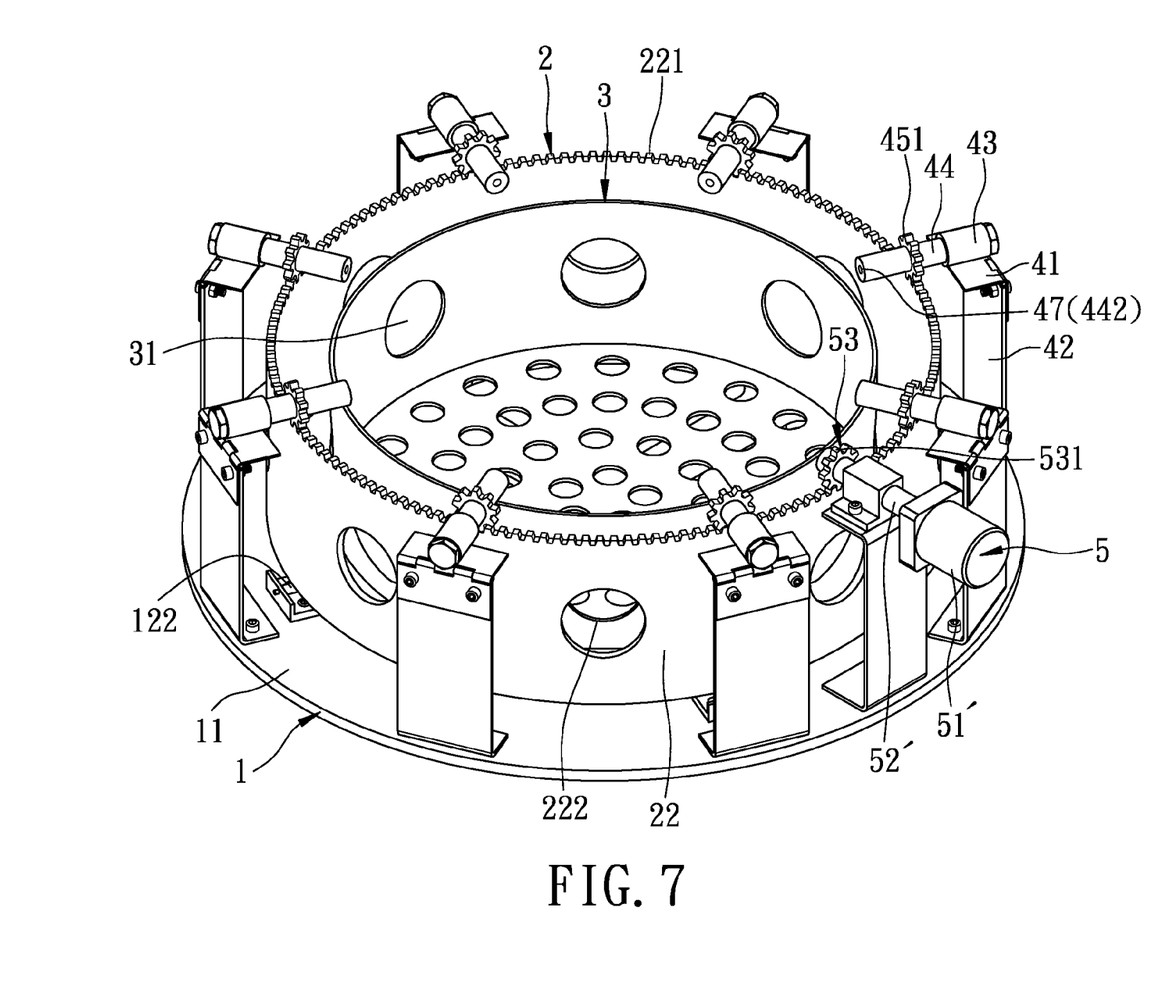
FIG. 7 is an assembled perspective view of the fourth preferred embodiment of a cooking device according to the present invention.

FIG. 7 illustrates the fourth preferred embodiment of the cooking device according to the present invention. The fourth preferred embodiment differs from the first embodiment in that, in this embodiment, the driving member 5 includes an output shaft 52' to replace the crankshaft 52 and a motor 51' to replace the handle 51. The motor 51' is coupled to the output shaft 52' so as to drive rotation of the driving wheel 53.

Figure 8:
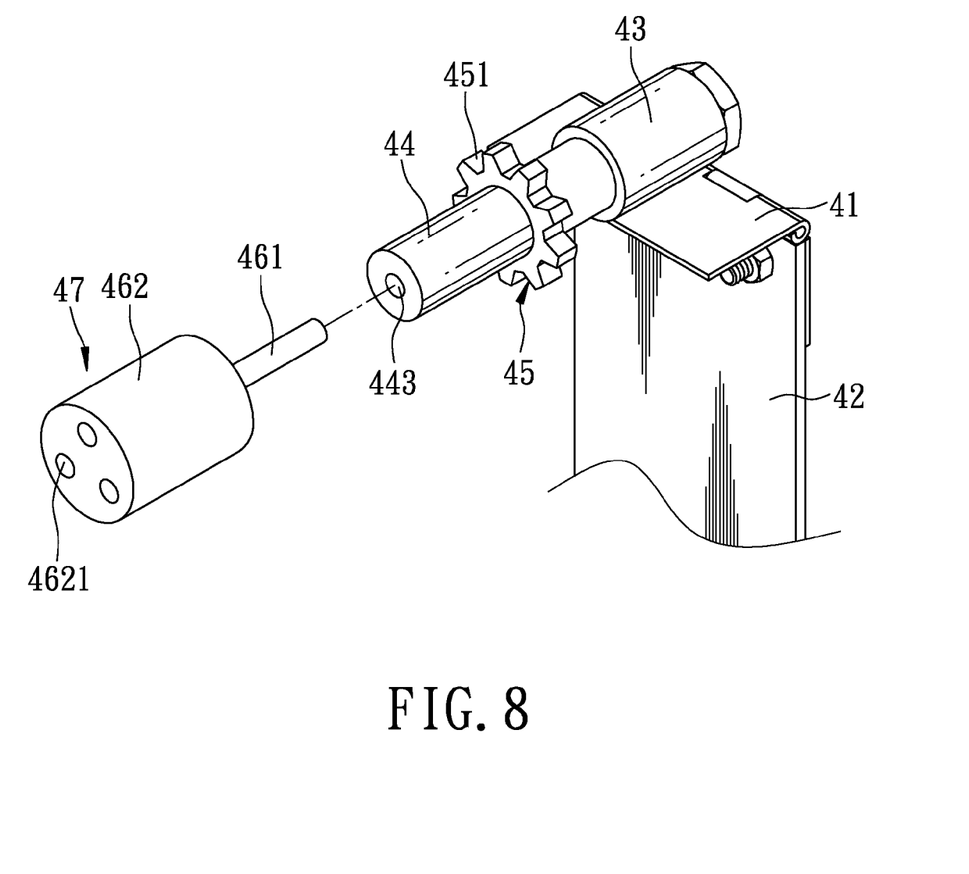
FIG. 8 is a fragmentary exploded perspective view illustrating how a holding means is coupled to a holding shaft of the fifth preferred embodiment of a cooking device according to the present invention.
Figure 9:
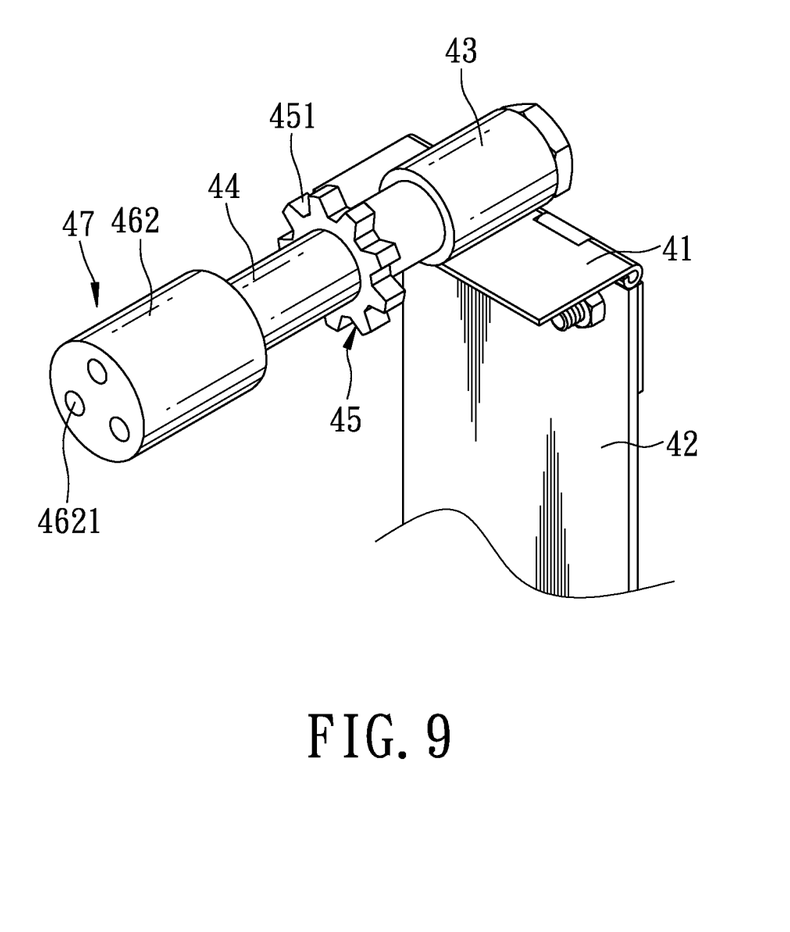
FIG. 9 is a perspective view illustrating a state where the holding means is coupled to the holding shaft of the fifth preferred embodiment.

FIGS. 8 and 9 illustrate the fifth preferred embodiment of the cooking device according to the present invention. The fifth preferred embodiment differs from the first preferred embodiment in that, in this embodiment, the holding means 47 has an insert pin 461 and a holding head 462 enlarged in cross-section from the insert pin 461 and formed with a plurality of insert holes 4621 for insertion of sticks or tines. Each of the holding shafts 44 is formed with an axial hole 443. The insert pin 461 is fitted into the axial hole 443.

By engaging the outer end faces 451 of the driven wheels 45 with the annular top transmission face 221 of the surrounding wall 22 to drive rotation of the holding shafts 44, and by supporting the heat supplying unit 3 on the bottom wall 21 of the rotation transmission member 2 to permit rotation of the heat supplying unit 3 together with the surrounding wall 22, the aforesaid drawbacks (i.e., the long length and the uneven cooking problems) associated with the prior art can be eliminated.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A cooking device comprising:
a base;
a rotation transmission member disposed above and mounted rotatably on said base and having a cylindrical surrounding wall that defines an annular top transmission face, said rotation transmission member being rotatable relative to said base about a first axis of said cylindrical surrounding wall;
a plurality of angularly-displaced holding shafts supported rotatably on said base, each of said holding shafts defining a second axis, being rotatable relative to said base about the second axis, and being provided with a holding means adapted to hold a food-holding element;
a plurality of driven wheels secured to and extending radially from said holding shafts, respectively, each of said driven wheels having an outer end face engaging said top transmission face in such a manner to drive rotation of each of said holding shafts about the second axis upon rotation of said rotation transmission member about the first axis;
a driving member for driving rotation of said rotation transmission member about the first axis, said driving member comprising a driving wheel having an outer end face disposed above and engaging said top transmission face to drive rotation of said rotation transmission member about the first axis;

a heat supplying unit, said rotation transmission member further having a bottom wall, said surrounding wall extending upright from a periphery of said bottom wall, said heat supplying unit being mounted on said bottom wall and being surrounded by said surrounding wall; and a plurality of upright supporting plates connected fixedly to and extending upright from said base and disposed around and spaced apart from said surrounding wall, a plurality of hinge plates pivoted to said upright supporting plates, respectively, and a plurality of shaft bearing sleeves mounted on said hinge plates, respectively, said holding shafts extending into and being in rotational contact with said shaft bearing sleeves, respectively.

2. The cooking device of claim 1, further comprising a central bearing sleeve extending upright from said base, said rotation transmission member further having a bottom wall and a central shaft, said surrounding wall extending upright from a periphery of said bottom wall, said central shaft extending downwardly from said bottom wall into said central bearing sleeve and being in rotational contact with said central bearing sleeve.

3. The cooking device of claim 1, herein said base has a top surface provided with a plurality of roller bearings that are angularly displaced from each other, said rotation transmission member further having a bottom wall, said surrounding wall extending upright from a periphery of said bottom wall, said bottom wall being in rotational contact with said roller bearings.

4. The cooking device of claim 1, wherein said top transmission face of said surrounding wall is toothed, said outer end face of each of said driven wheels being toothed and meshing with said top transmission face.

5. The cooking device of claim 1, wherein said top transmission face of said surrounding wall and said outer end face of each of said driven wheels are roughened.

6. The cooking device of claim 1, wherein said surrounding wall is formed with a plurality of air though-holes.

7. The cooking device of claim 1, wherein said heat supplying unit is formed with a plurality of air holes.

8. The cooking device of claim 1, wherein said driving member is supported on said base and includes a crankshaft supported rotatably on said base, said driving wheel extending radially from said crankshaft.

9. The cooking device of claim 8, wherein said top transmission face of said surrounding wall is toothed, said outer end face of said driving wheel being toothed and meshing with said top transmission face.

10. The cooking device of claim 8, wherein said top transmission face of said surrounding wall and said outer end face of said driving wheel are roughened.

11. The cooking device of claim 1, wherein each of said holding shafts is formed with a axial insert channel that defines said holding means.

12. The cooking device of claim 1, wherein said holding means has an insert pin and a holding head enlarged in cross-section from said insert pin and formed with a plurality of insert holes, each of said h holding shafts being formed with an axial hole, said insert pin being fitting into said axial hole.

13. The cooking device of claim 1, further comprising a grill screen, said heat supplying unit having a top end, said grill screen being disposed on said top end of said heat supplying unit.

14. The cooking device of claim 7, wherein said heat supplying unit is spaced apart from said surrounding wall by an annular gap, said surrounding wall being formed with a plurality of air through-holes that are in fluid communication with said air holes in said heat supplying unit through said annular gap.

* * * * *